United States Patent [19]
Bender et al.

[11] Patent Number: 5,915,313
[45] Date of Patent: Jun. 29, 1999

[54] MULTIPLE-TYPE SEED DISPENSING SYSTEM

[75] Inventors: Timothy J. Bender, Racine, Wis.; David D. Flamme, Downers Grove, Ill.

[73] Assignee: Case Corporation, Racine, Wis.

[21] Appl. No.: 08/822,432

[22] Filed: Mar. 21, 1997

[51] Int. Cl.$^6$ ........................................................ A01L 7/00

[52] U.S. Cl. ............................. 111/178; 111/903; 701/50; 221/211; 221/278; 221/9

[58] Field of Search ..................................... 111/177, 170, 111/178, 179, 200, 900, 903, 904, 911; 701/50; 239/1; 172/1, 2; 221/211, 278, 9, 10

[56] References Cited

U.S. PATENT DOCUMENTS

| | | | |
|---|---|---|---|
| Re. 35,100 | 11/1995 | Monson et al. | 111/130 |
| 3,762,603 | 10/1973 | Bauman et al. | |
| 3,848,552 | 11/1974 | Bauman et al. | |
| 3,860,146 | 1/1975 | Bauman et al. | |
| 3,885,704 | 5/1975 | Lienemann et al. | |
| 4,128,191 | 12/1978 | Frase et al. | |
| 4,148,414 | 4/1979 | Parks, Jr. | |
| 4,473,016 | 9/1984 | Gust | 111/86 |
| 4,630,773 | 12/1986 | Ortlip | |
| 4,758,119 | 7/1988 | Frase et al. | |
| 5,082,141 | 1/1992 | Martin et al. | |
| 5,170,730 | 12/1992 | Swallow | |
| 5,174,115 | 12/1992 | Jacobson et al. | |
| 5,189,965 | 3/1993 | Hobbs et al. | |
| 5,220,876 | 6/1993 | Monson et al. | 111/130 |
| 5,260,875 | 11/1993 | Tofte et al. | |
| 5,323,721 | 6/1994 | Tofte et al. | 111/903 X |
| 5,431,117 | 7/1995 | Steffens et al. | |
| 5,598,794 | 2/1997 | Harms et al. | |
| 5,606,850 | 3/1997 | Nakamura | 111/911 X |
| 5,635,911 | 6/1997 | Landers et al. | 111/903 X |
| 5,646,846 | 7/1997 | Bruce et al. | 111/903 X |
| 5,684,476 | 11/1997 | Anderson | 111/130 X |

OTHER PUBLICATIONS

*The Terranova VRS™ Variable Rate System* by N.W. Anderson, ASAE paper No. 95–1754 Jun. 1995.

*10 Reasons Farmers Enlist Granules & Air–Spred® to Combat Their Weeds,* by Gandy Company Manufactures.

*Hybrid No–Till Planter Shines,* The Farmer/Dakota Farmer, pp. 10–11 Jan. 1996.

*Dial In Seeding Rates, Varieties for Soybeans* by Larry Reichenberger, pp. 24A–D Farm Journal Mar. 1996.

*Early Riser, 955 Series Cyclo Air® Planters,* 1996 Case Corporation.

*Early Riser®, Cyclo Air® and Plate Planters RC Cultivators and Hoes,* 1995 Case Corporation.

(List continued on next page.)

*Primary Examiner*—Victor Batson
*Attorney, Agent, or Firm*—Foley & Lardner

[57] ABSTRACT

A system for dispensing multiple types of seed as a planting apparatus (planter or drill) travels throughout an agricultural field is disclosed herein. The planting apparatus is typically an implement having row units for applying seed to the field as the implement is pulled by a vehicle (tractor). The system includes multiple seed bins configured to store multiple types of seed (e.g., multiple crops or varieties). Multiple bins can be formed within a seed hopper by a removable dividing wall. A switch assembly selectively discharges seed from one seed bin in response to control signals generated in a manual or an automatic mode. The control signals are generated using an operator input device in manual mode, and using location signals and a prescription type map in automatic mode. Discharged seed is received by a distribution assembly for delivery to the row units. The distribution assembly preferably includes a seed selector for separating individual seeds, and an air delivery system for delivering the individual seeds to the row units. The seed selector may include a rotatable drum driven by a variable-rate motor. The rotation rate determines the rate at which the seeds are dispensed and is controlled by rate control signals generated using the location signals and a prescription rate map.

26 Claims, 11 Drawing Sheets

OTHER PUBLICATIONS

PCT Form/ISA/220, International Search Report for Application, PCT/US98/04772; Jun. 24, 1998.

"Air Till Drill Systems, Concord"; sales brochure for Case Corporation; 1996.

"Precision Farm Equipment, Firmly Planted for the Future, Concord"; sales brochure for Case Corporation; 1996.

| DATA POINT NO. | LONGITUDE | LATITUDE | APPLICATION RATE (SEEDS / ACRE) | APPLICATION TYPE (BIN NO.) | ... |
|---|---|---|---|---|---|
| 1 | -88.7291520 | 39.0710720 | 24000 | 1 | |
| 2 | -88.7291140 | 39.0710720 | 24100 | 1 | |
| 3 | -88.7290720 | 39.0710740 | 24200 | 2 | |
| 4 | -88.7290320 | 39.0710760 | 24200 | 2 | |
| 5 | -88.7289890 | 39.0710740 | 24200 | 2 | |
| . | . | . | . | . | |
| . | . | . | . | . | |
| . | . | . | . | . | |

↖ 150

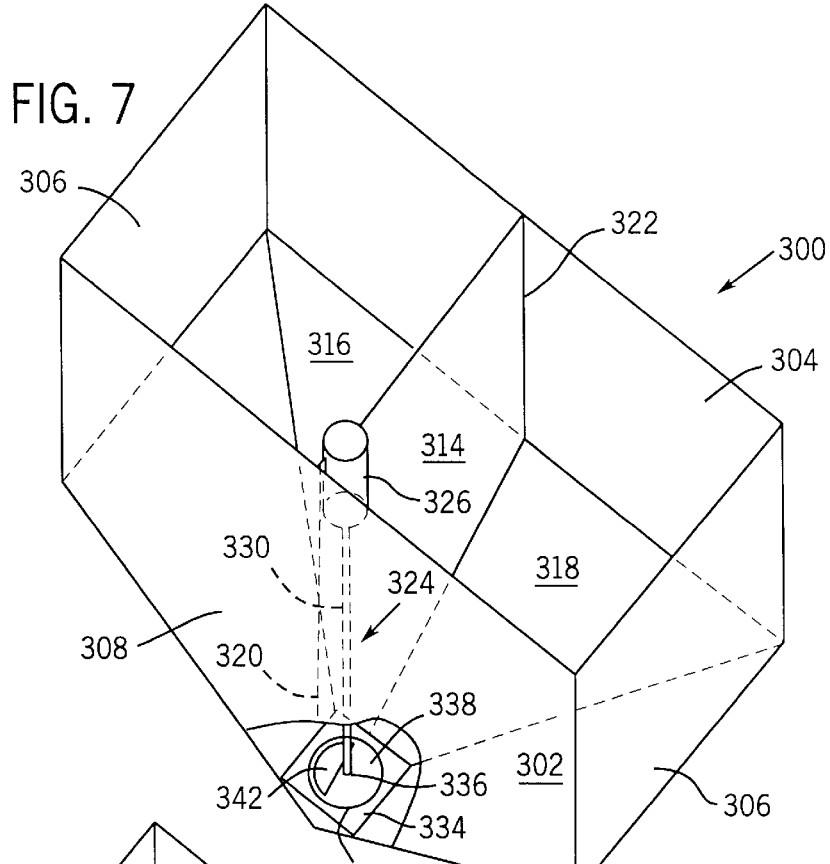
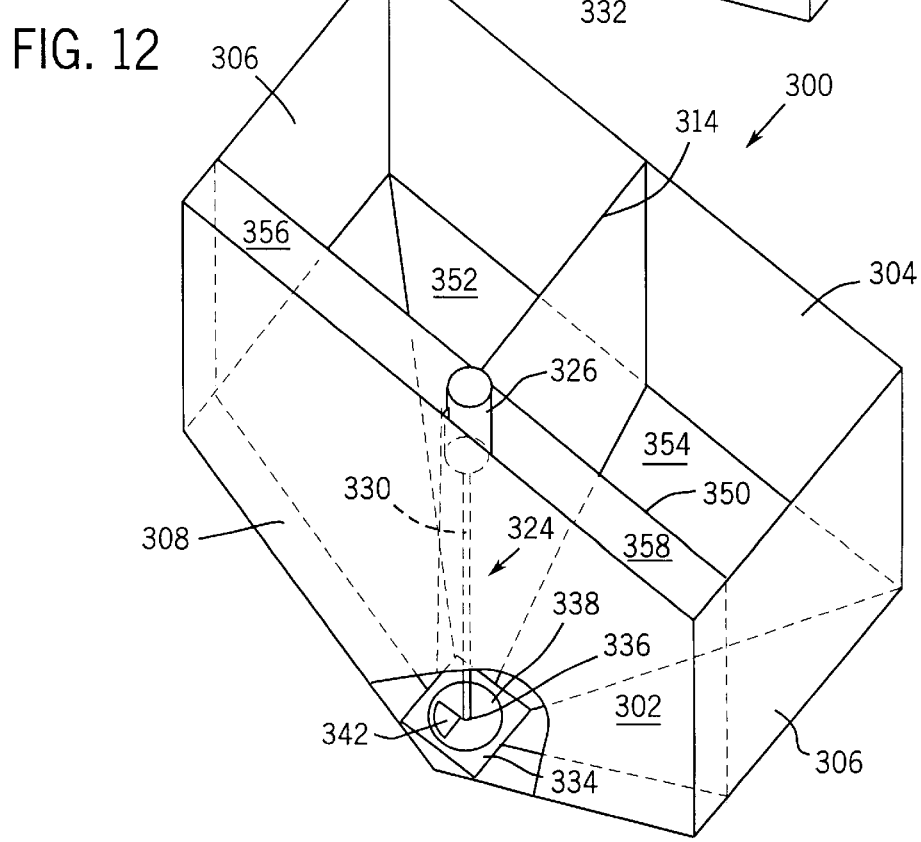

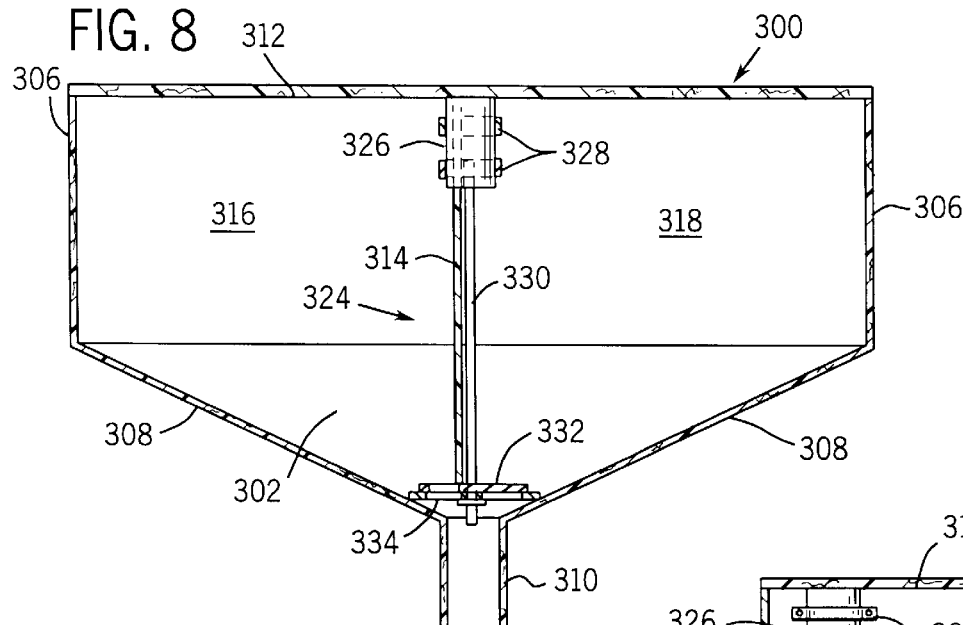
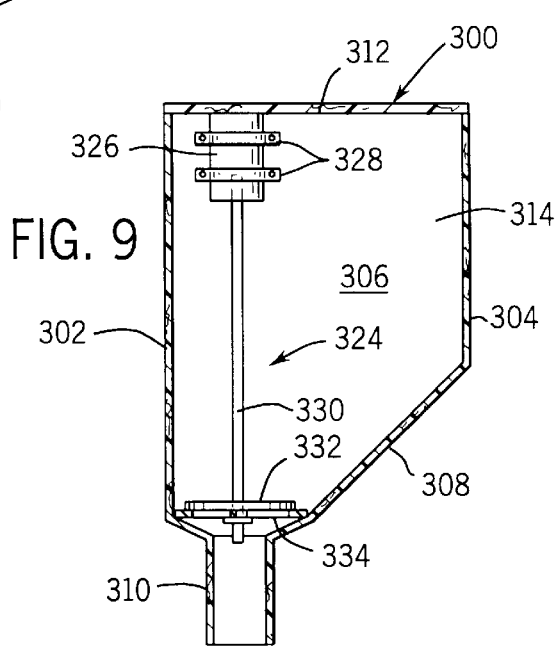
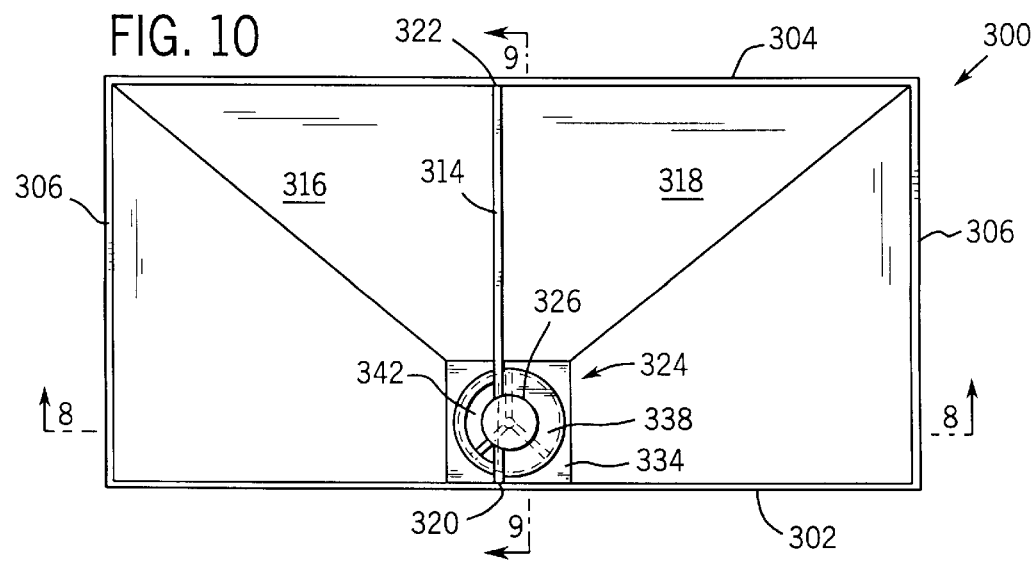

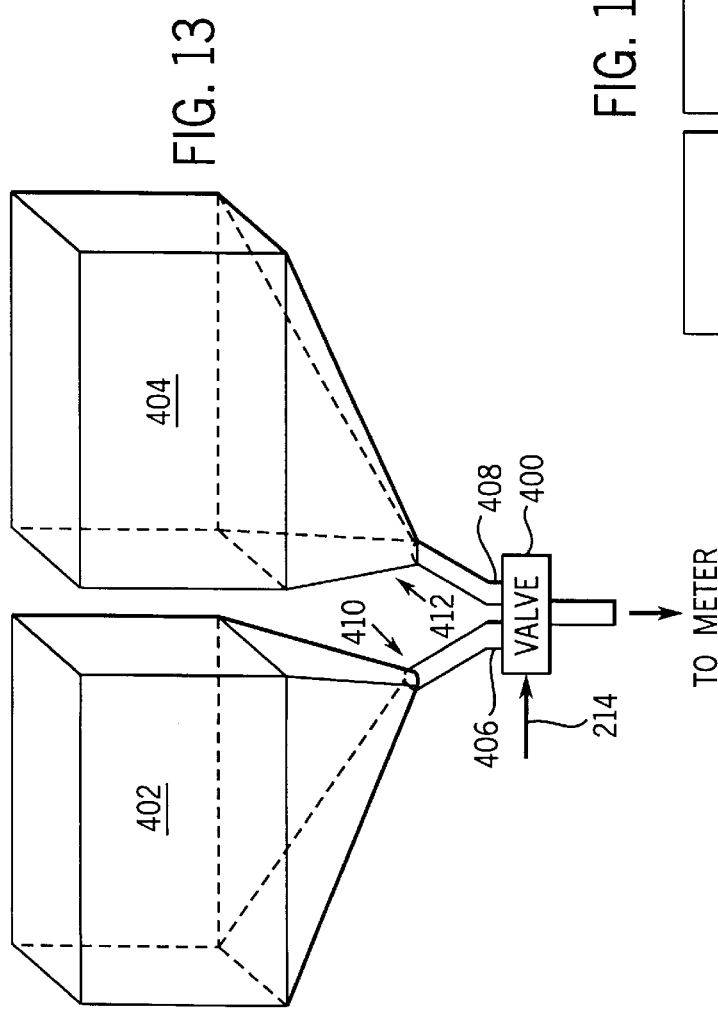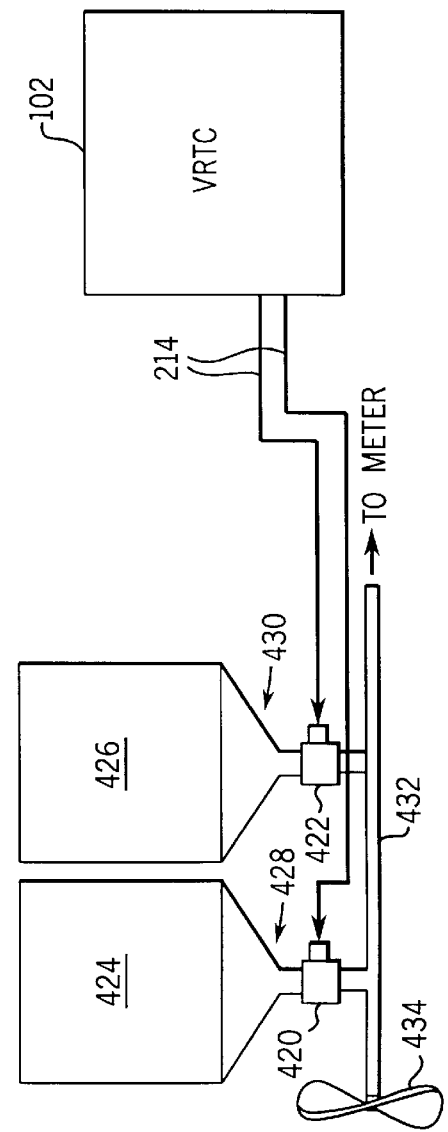
FIG. 13
FIG. 14

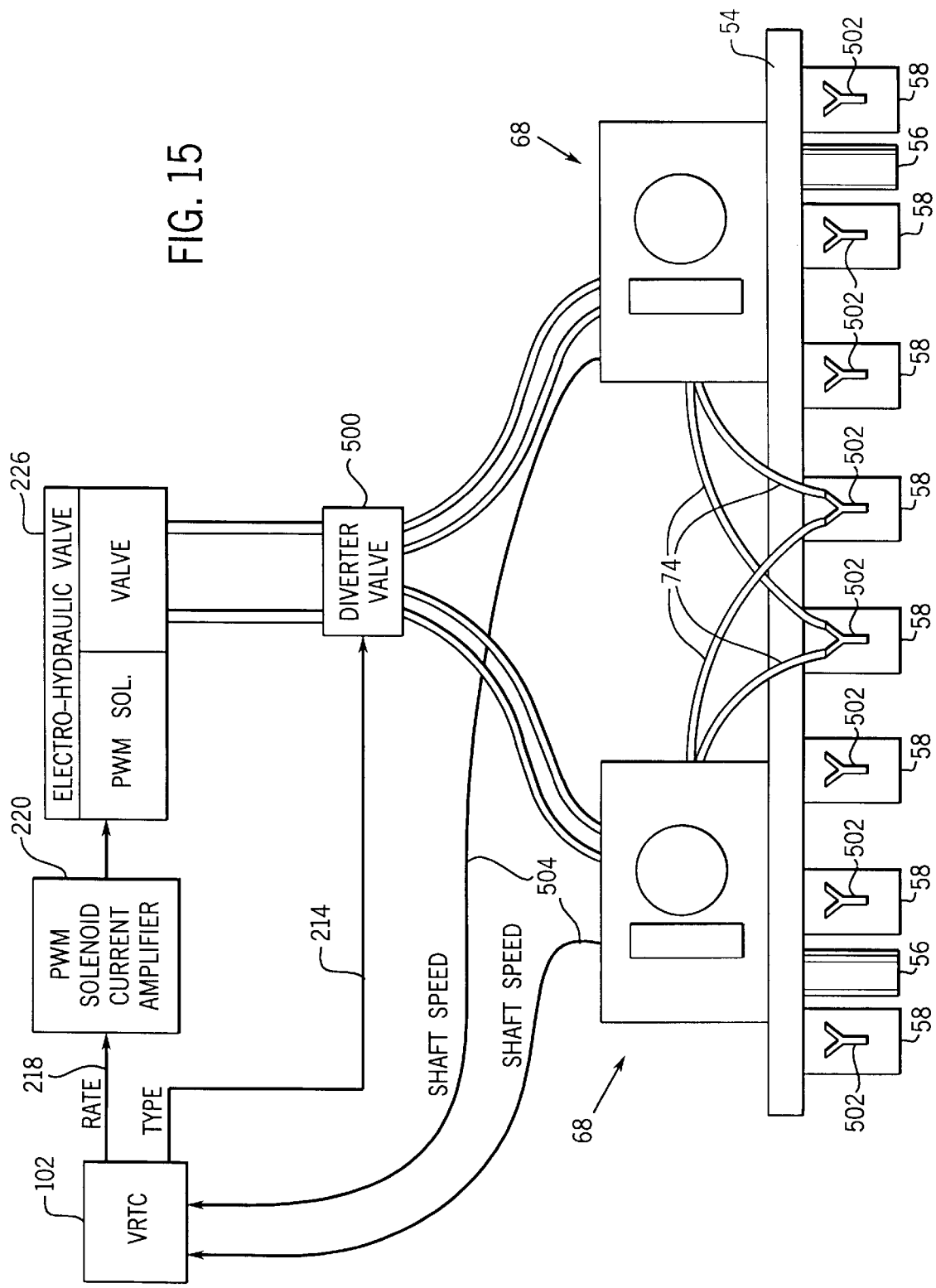

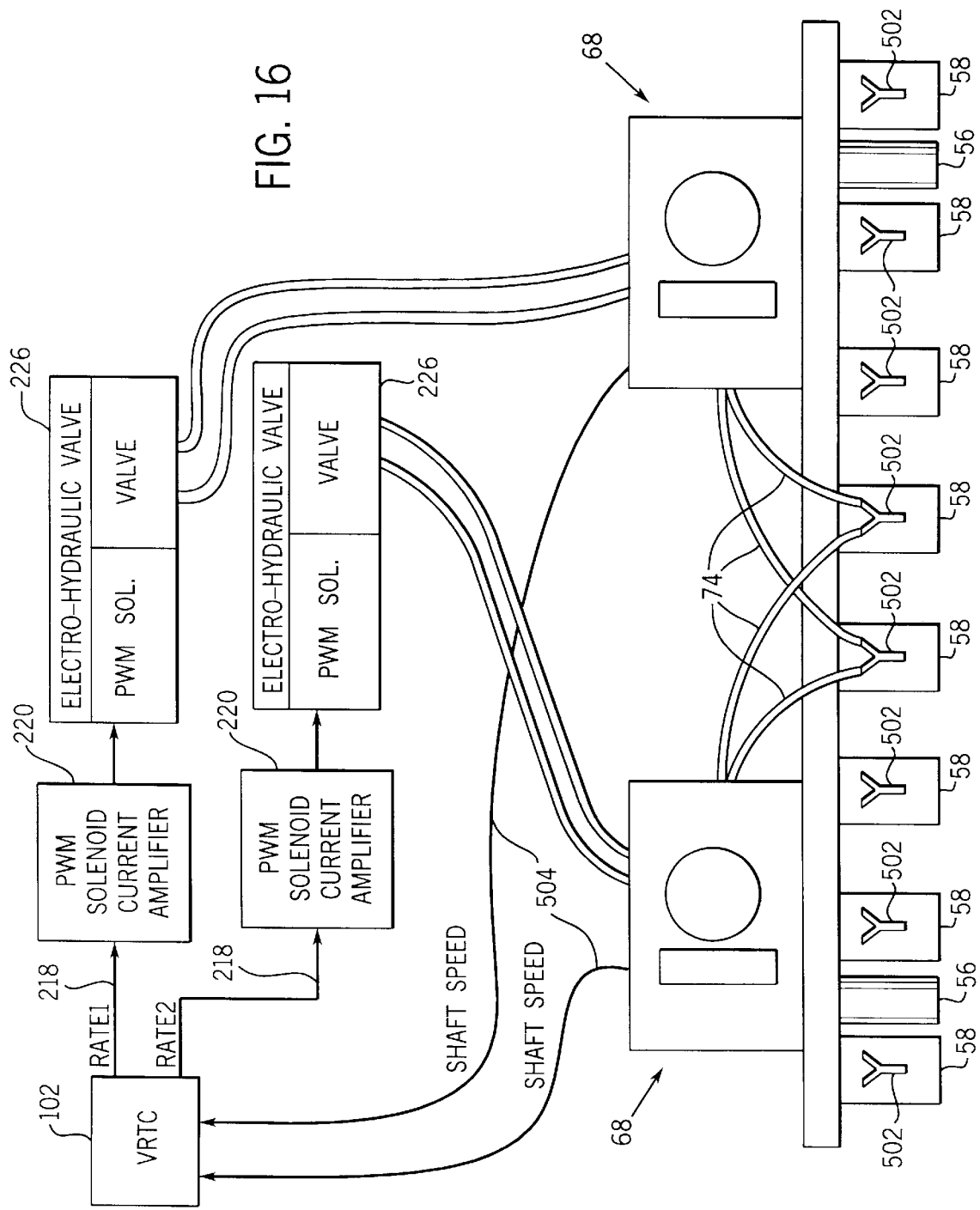

MULTIPLE-TYPE SEED DISPENSING SYSTEM

FIELD OF THE INVENTION

The present invention relates generally to seed dispensing systems for agricultural planters and drills. In particular, the present invention relates to a system for dispensing multiple types of seed as an agricultural planter or drill moves throughout an agricultural field.

BACKGROUND OF THE INVENTION

Planting apparatus such as planters and drills are used for planting seed in agricultural fields. Planters and drills are typically implements having row units for applying seed to the field as the implement is pulled by a vehicle such as an agricultural tractor. Typically, planters meter individual seeds while drills plant a mass or volume of seed. The metering and placement accuracy is typically higher for planters than for drills. Thus, seeds of crops (e.g., corn) which require relatively high metering and placement accuracies for efficient growth are typically planted using planters, while seeds of crops (e.g., wheat; oats) which grow efficiently in more varied seed environments are planted by lower accuracy and less expensive drills. Despite the differences, both types of planting apparatus typically include a seed hopper for storing a single type of seed to be planted.

Many types of planters and drills are known and are illustrated by the product lines made by Case Corp. of Wisconsin, the assignee of the present invention. For example, 955 Series EARLY RISER CYCLO AIR® Planters are a family of planters including central-fill seed hoppers for storing seed, pressurized air metering systems for metering seed and air distribution systems for delivering the metered seed to row units. Planter models in this family can plant different numbers of rows at different row widths. Case Corp. also makes the 900 Series EARLY RISER Plate Planter family which includes a variety of plate planter models. Drills made by Case Corp. include the 5300, 5400, 5500, 7100 and 7200 drills which include different numbers of openers, opener spacings and seeding widths. The above-described planters and drills are used to apply a single type of seed stored in a seed hopper.

Conventional agricultural practices have treated fields as having uniform parameters. However, research has shown that crop production may be optimized by taking into account spatial variations that often exist within a given farming field. For example, by varying the farming inputs applied to a field according to local conditions within the field, crop yield as a function of the inputs being applied can be optimized while environmental damage is prevented or minimized. Farming inputs which have been applied according to local field conditions include herbicides, insecticides, and fertilizers. The practice of farming according to local field conditions is known as precision, site-specific or prescription farming.

Prescription farming, however, has not adequately managed the type of seed which is applied to a field. As explained above, conventional planting apparatus applies a single type of seed uniformly throughout a field. This practice does not account for site-specific variations throughout a field that affect the seed environment and the efficiency of different types of seed. Site-specific parameters which affect the seed environment include soil type, nutrient levels, field slope, weed pressure, insect pressure, and past yield history. Because variations in these parameters throughout a field have varying affects on different types of seed, results obtained when a field is planted using a conventional planting apparatus which plants a single type of seed have been less than optimal.

A situation in which the optimal seed type depends upon site-specific parameters includes the use of seeds genetically engineered for increased insect resistance. Advantages of such seeds can be offset by disadvantages such as increased cost and decreased yield. Efficiency may therefore be optimized by planting such seeds only in areas of a field which are infested by insects with other areas planted with conventional seed. However, switching between these seed types using conventional planters and drills has been difficult and inconvenient. Other situations in which the use of multiple types of seed in a field could increase productivity are known to farmers.

Accordingly, it would be advantageous to provide a system for dispensing multiple types of seed throughout an agricultural field. The multiple types of seed can include seeds of different crops, or seeds of different varieties of the same crop. It would be advantageous to provide a system for dispensing multiple types of seed according to a predetermined geo-referenced prescription type map. Further, it would be advantageous to provide a system for dispensing multiple types of seed at variable rates according to prescription type and rate maps. It would also be advantageous to provide controls allowing for manual override of the prescription type or rate. It would further be advantageous to provide a system for dispensing multiple types of seed which requires only minimal modifications to existing planting apparatus.

SUMMARY OF THE INVENTION

An embodiment of the present invention provides a system for dispensing multiple types of seed in response to control signals generated as a planting apparatus travels throughout an agricultural field. The planting apparatus includes a plurality of row units for applying seed to the field. The system includes first and second seed bins configured to store first and second types of seed. The first and second seed bins have a first and a second discharge outlet, respectively, to discharge the seed. The system also includes a switch assembly coupled to the first and the second discharge outlets and configured to selectively discharge one of the first and the second types of seed through the first and the second discharge outlets, respectively, depending upon the control signals, and a distribution assembly configured to receive the one type of seed selectively discharged through the first and the second discharge outlets depending upon the configuration of the switch assembly, and to distribute the received seed to the row units.

In a second embodiment of the present invention, a system for dispensing multiple types of seed includes a location signal generation circuit configured to receive positioning signals and to generate location signals therefrom which represent the current position of the planting apparatus, a memory circuit configured to store a geo-referenced map including spatially-variable map data indicative of prescribed types of seed throughout the field, and a control circuit coupled to the location signal generation circuit, the memory circuit and the switch assembly. The control circuit is configured to determine the prescribed type of seed based at least upon the location signals and the map data, to generate the control signals based upon the prescribed type of seed, and to apply the control signals to the switch assembly.

In a third embodiment of the present invention, a system for dispensing multiple types of seed in response to first control signals applies the seed at variable rates in response to second control signals. The system includes a distribution assembly configured to distribute received seed to row units at a rate which depends upon the second control signals. The memory circuit stores a geo-referenced map including spatially-variable map data indicative of both prescribed types and rates of seed throughout the field. The control circuit is configured to determine the prescribed type and rate of seed based at least upon the location signals and the map data, to generate the first and the second control signals based upon the prescribed type and rate of seed, respectively, and to apply the first and second control signals to the switch assembly and distribution assembly, respectively.

A fourth embodiment of the present invention provides a system for dispensing multiple types of seed in response to control signals generated as a planting apparatus travels throughout an agricultural field. The planting apparatus includes a plurality of row units for applying seed to the field. The system includes first and second seed bins configured to store first and second types of seed. The first and second seed bins have a first and a second discharge outlet, respectively, to discharge the seed. The system also includes a first distribution assembly configured to receive the first type of seed discharged through the first discharge outlet and to distribute the first type of seed to the row units based upon the control signals, and a second distribution assembly configured to receive the second type of seed discharged through the second discharge outlet and to distribute the second type of seed to the row units based upon the control signals.

A fifth embodiment of the present invention provides a system for dispensing multiple types of seed in response to control signals generated as a planting apparatus travels throughout an agricultural field. The planting apparatus includes a plurality of row units for applying seed to the field. The system includes means for storing a first type of seed, means for storing a second type of seed, means for selectively discharging one of the first and the second types of seed depending upon the control signals, and means for receiving the one type of seed selectively discharged and for distributing the received seed to the row units.

BRIEF DESCRIPTION OF THE DRAWINGS

The invention will become more fully understood from the following detailed description, taken in conjunction with the accompanying drawings, wherein like reference numerals refer to like parts, in which:

FIG. 7 is a perspective view of a seed hopper which includes a wall dividing the hopper into two seed bins, and a switch assembly for selectively discharging seed from one of the multiple seed bins;

FIG. 8 is a front elevational view of the seed hopper shown in FIG. 7;

FIG. 9 is a side elevational view of the seed hopper shown in FIG. 7;

FIG. 10 is a top view of the seed hopper shown in FIG. 7;

FIG. 12 is a perspective view showing another embodiment of the present invention wherein a seed hopper is divided into more than two bins;

FIG. 13 is a schematic diagram showing another embodiment of the present invention wherein the switch assembly includes a valve located outside the seed bins;

FIG. 14 is a schematic diagram showing another embodiment of the present invention wherein the switch assembly includes multiple valves;

FIG. 15 is a schematic diagram showing another embodiment of the present invention wherein multiple distribution assemblies dispense multiple seed types; and FIG. 16 is a schematic diagram showing another embodiment of the present invention similar to that of FIG. 15 except that the distribution assemblies are driven independently.

DETAILED DESCRIPTION OF THE PREFERRED EMBODIMENTS

Figure 1:
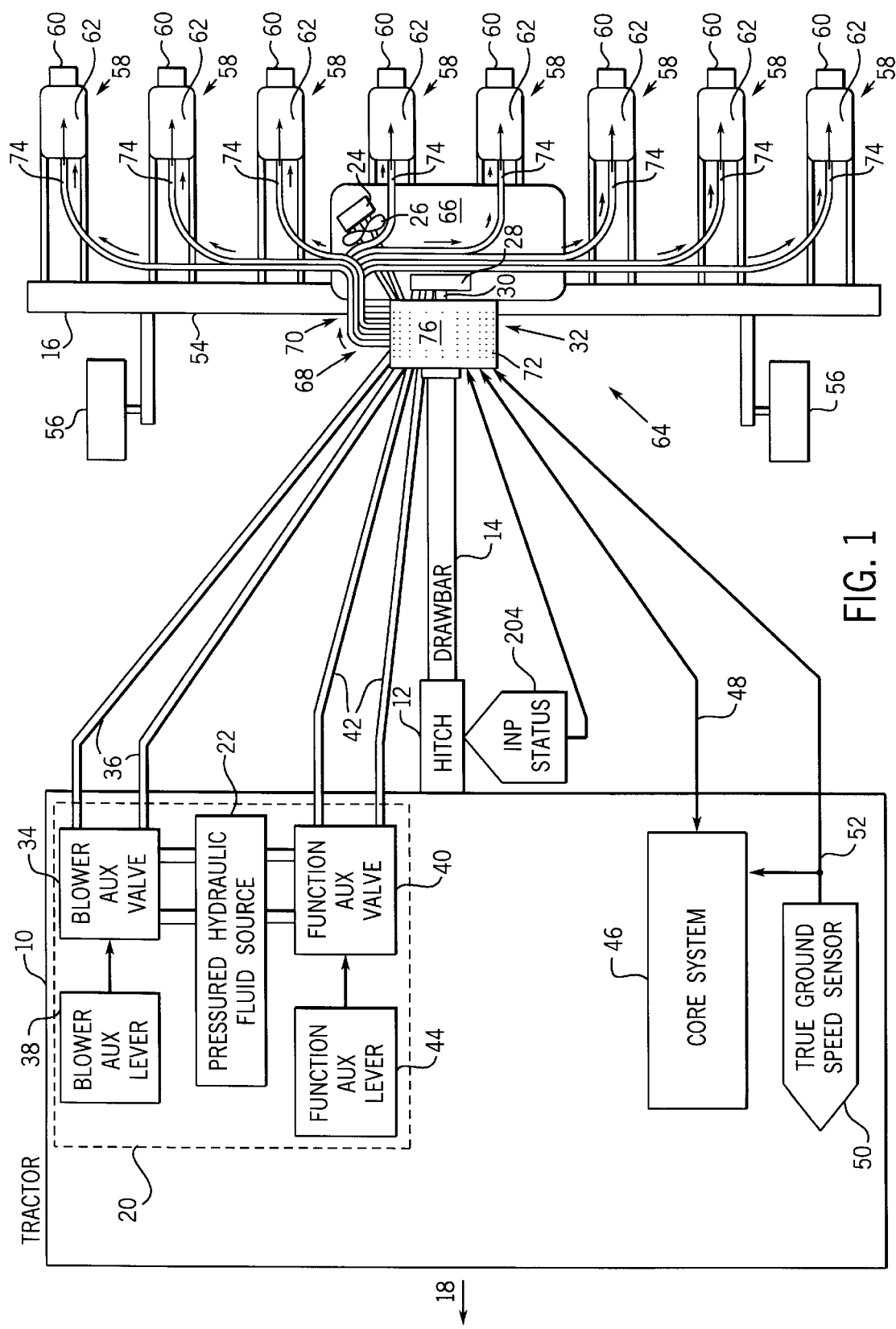
FIG. 1 is a schematic diagram illustrating an agricultural vehicle pulling a planting apparatus equipped with eight row units and a system for dispensing multiple types of seed at variable rates.

Referring to FIG. 1, an agricultural vehicle such as a tractor 10 includes a hitch assembly 12 for connection to a drawbar 14 of an implement 16. Tractor 10 includes an engine and drive train (not shown) for propelling tractor 10 and implement 16 in a forward direction represented by arrow 18. Tractor 10 may be a MAGNUM® tractor and implement 16 may be a 955 Series CYCLO AIR® Planter, both made by Case Corp. of Wisconsin. Some features of the CYCLO AIR® planters are described in U.S. Pat. Nos. 3,762,603, 3,848,552, 3,860,146, 3,885,704, 4,128,191 and 4,758,119, commonly assigned and herein incorporated by reference. Other tractors can be used to move other types of planting implements including mounted, semi-mounted and trailing planters and drills.

Tractor 10 includes an auxiliary (AUX) hydraulic system 20 for supplying pressurized hydraulic fluid from a source 22 (e.g., an engine-driven pump) to attachments such as implement 16. AUX hydraulic system 20 can power two hydraulic motors on implement 16: a blower hydraulic motor 24 which drives a fan 26 to generate air pressure used for seed metering and distribution; and a function hydraulic motor 28 which turns a shaft 30 to drive a metering system 32. A blower AUX valve 34 controls the flow of fluid via conduits 36 to blower hydraulic motor 24 depending on the position of a blower AUX lever 38, and a function AUX valve 40 controls the flow of fluid via conduits 42 to function hydraulic motor 28 depending on the position of a function AUX lever 44. AUX levers 38 and 44, located in the tractor cab, are treated herein as turning the fluid flow to implement 16 on and off, and it is assumed that the operator will set both levers to provide sufficient power for hydraulic motors 24 and 28. For larger planters, fluid to hydraulic motors 24 and 28 can be supplied by a closed hydraulic system on implement 16 driven by a power take-off shaft of tractor 10.

Tractor 10 is also equipped with a core system 46 which communicates with implement 16 via a bus 48 (e.g., a bidirectional RS-485 interface) as described below. A true ground speed sensor 50 (e.g., a radar device mounted to the body of tractor 10) generates a signal applied to core system 46 and implement 16 via bus 52 which has a frequency proportional to true ground speed. Sensor 50, however, can also include a magnetic pickup sensor which senses the speed of the vehicle's undriven wheels. An estimated true ground speed can be obtained from a pickup sensor associated with the driven wheels or transmission.

Implement 16 includes a frame 54 (i.e., a toolbar) pulled by tractor 10 via drawbar 14 and supported above the ground by carrying wheels 56. Secured to frame 54 are row units 58, preferably using bolts for flexibility in changing row spacing and planter configuration. Row units 58 form furrows in the ground and plant dispensed seed in the furrows, and may include offset disk openers (not shown) to penetrate residue and soil, gauge wheels (not shown) to maintain constant planting depth and seed placement, furrow forming points (not shown) to define the seed trenches formed by the disk openers, applicators to place seed in the furrows, covering disks (not shown) to fill the furrows, and press wheels 60 to compress soil over the furrows. Hoppers 62 may be provided to store chemicals (e.g., fertilizers) applied during planting.

Figure 6:
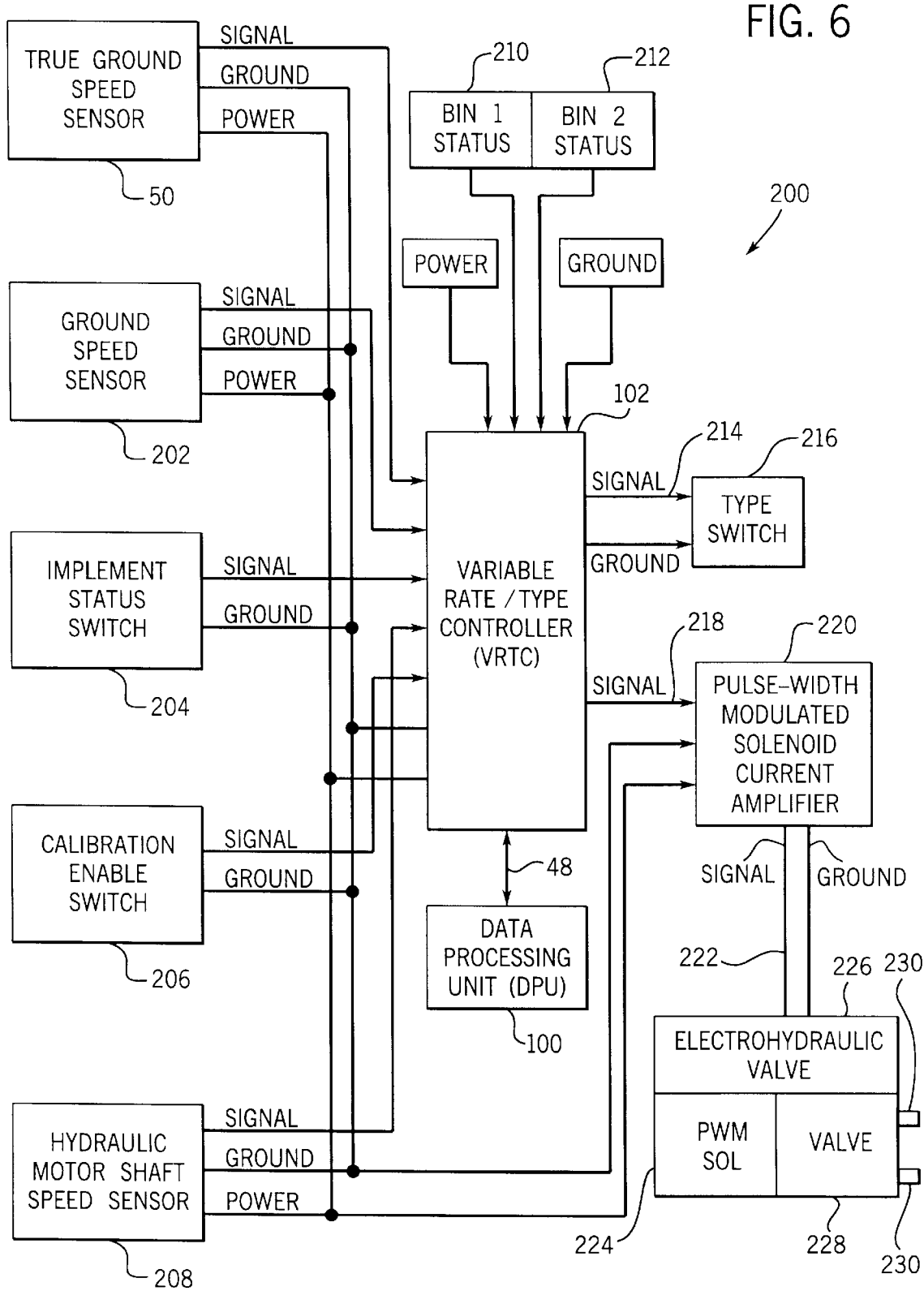
FIG. 6 is a block diagram illustrating components of a variable rate and type control system including the VRTC shown in FIG. 2.
Figure 11:
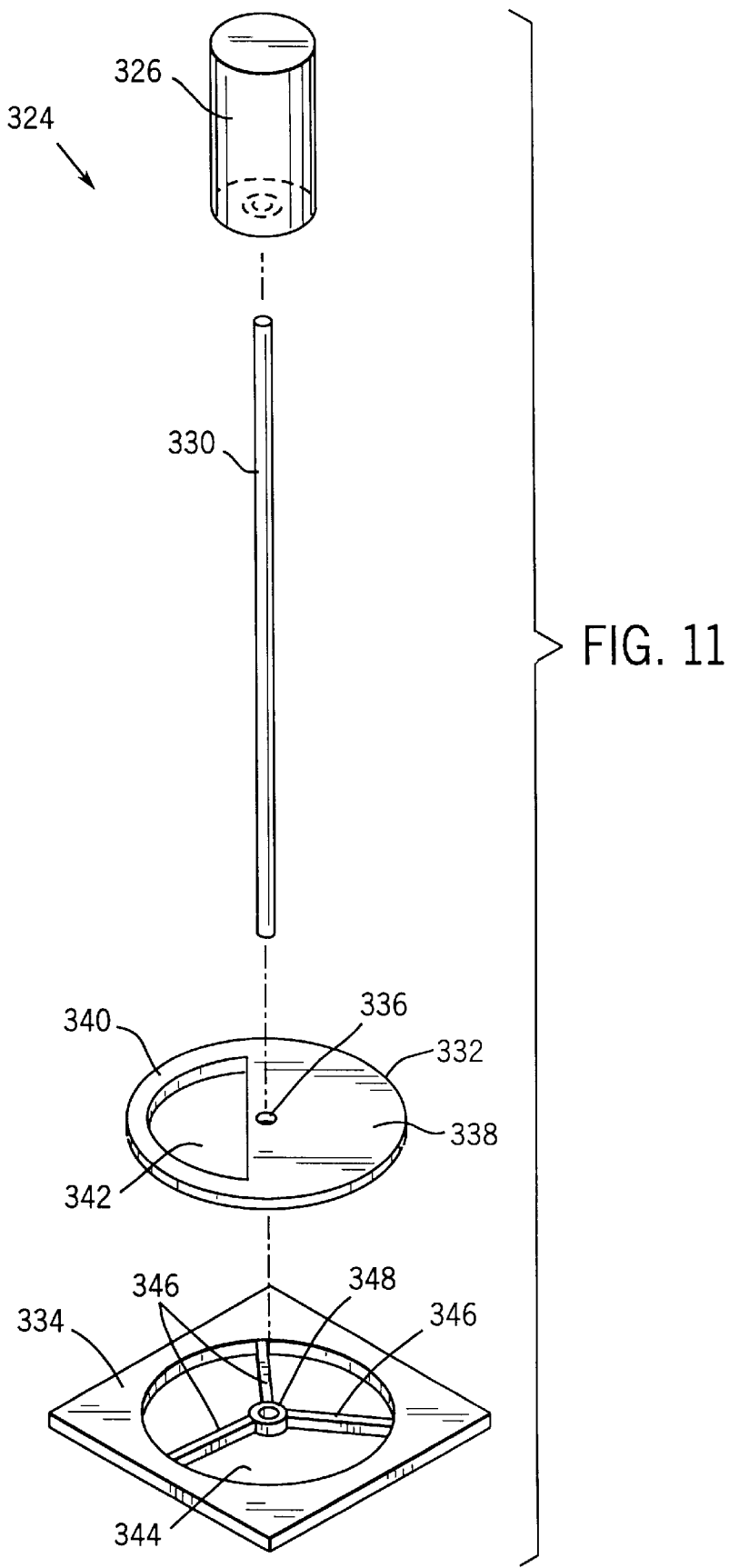
FIG. 11 is an exploded view showing the components of the switch assembly shown in FIG. 7.

Frame 54 supports a seed dispensing system 64 for multiple types of seed which includes an enclosure 66 for enclosing blower assembly 24–26, function assembly 28–30, a central-fill hopper 300 (FIG. 7) for storing multiple types of seed, a switch assembly 324 (FIG. 7) for selecting a type of seed, and components of a variable rate and type control system 200 (FIG. 6). Dispensing system 64 also includes a distribution assembly 68 which includes metering system 32 for metering individual seeds and a delivery system 70 for delivering metered seeds to row units 58. Metering system 32 and delivery system 70 include a singulator or seed selector 72 for separating individual seeds which are deposited into a manifold for delivery to row units 58 via seed tubes 74.

Dispensing system 64 is a pneumatic system which uses pressurized air for metering and distributing seed. However, portions of dispensing system 64 can be used on planting apparatus such as gravity planters, or planters using air pressure only for metering or for distribution. Seed stored in enclosure 66 is released as described below into the bottom of a perforated drum 76 secured to shaft 30 and forming part of singulator 72. Drum 76 has holes arranged in circumferentially-spaced rows (e.g., 8 rows/8-row planter), each row having a plurality of holes with diameters smaller than the seed being planted. The arrangement of drum 76 depends upon the planter and seed type, and Case Corp. makes a full line of interchangeable drums. Blower assembly 24–26 pressurizes drum 76 and creates an air pressure differential above atmospheric. As function assembly 28–30 rotates drum 76, the pressure differential causes each hole to pick up one seed at the bottom of drum 76, and retains the picked-up seed against the hole as drum 76 rotates. After further rotation moves the retained seeds above the manifold, the holes are plugged by release wheels (not shown) outside drum 76 to eliminate the force retaining the seeds and to cause the seeds to drop into the manifold. The seeds are then pushed by a cushion of pressurized air from blower assembly 24–26 through seed tubes 74 to row units 58.

The seed application rate depends upon ground speed and the rotation rate of drum 76. A constant application rate is obtained by driving shaft 30 via a transmission (not shown) coupled to carrying wheels 56. However, a variable application rate is obtained by controlling the rotation rate of drum 76 as a function of ground speed and a commanded application rate. Shaft 30 is driven at a variable rate by function hydraulic motor 28 depending upon settings of an electrohydraulic valve 226 (FIG. 6) also within enclosure 66. Valve 226 receives fluid from function AUX valve 40 and regulates flow to motor 28 in response to control signals generated as described below.

Figure 2:
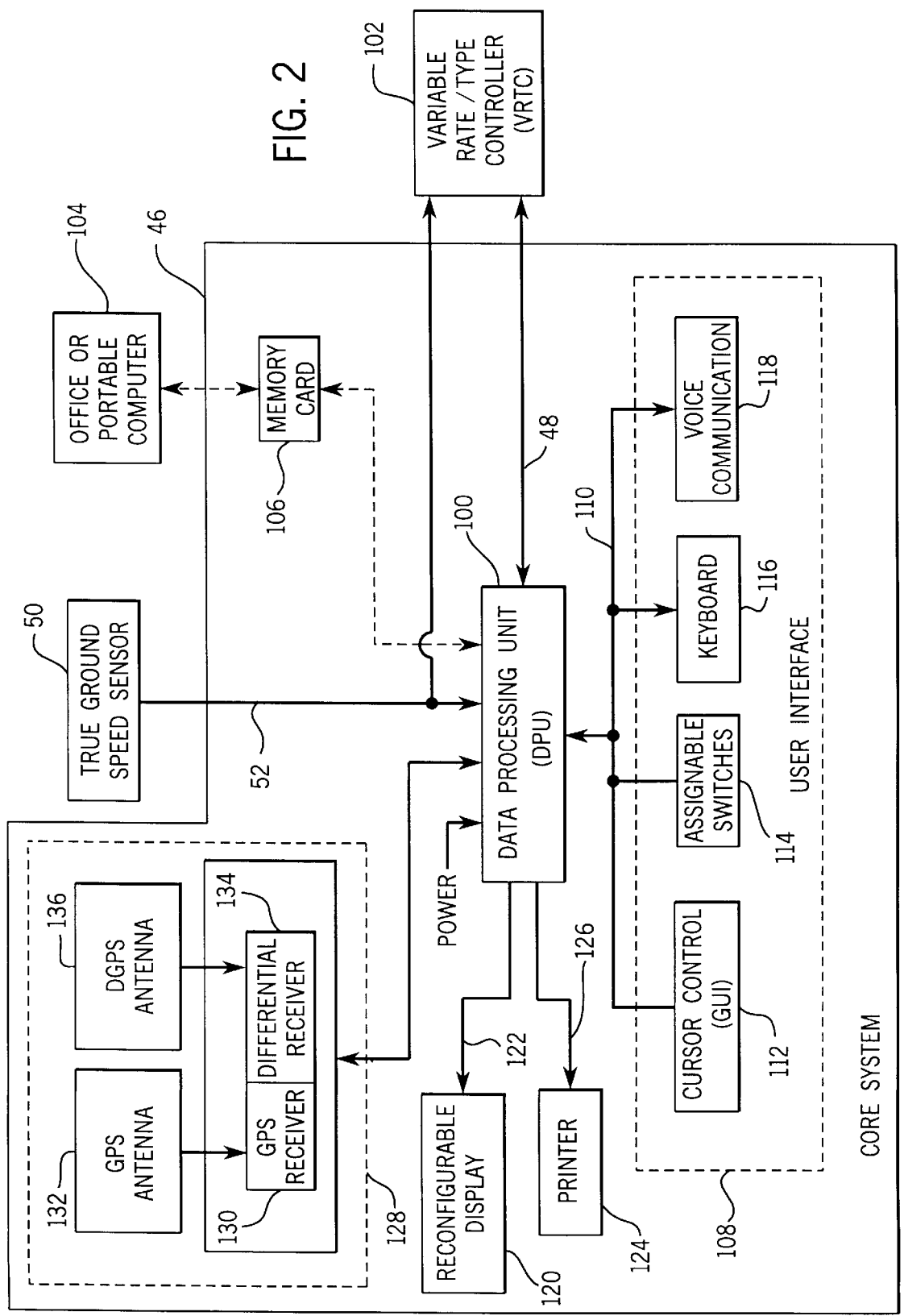
FIG. 2 is a block diagram illustrating the core system shown in FIG. 1 which includes components such as a Global Positioning System (GPS) receiver, a memory card for storing geo-referenced seed rate and type maps, and a data processing unit (DPU) having an interface for communicating to a variable rate/type controller (VRTC)

Referring to FIG. 2, core system 46 includes a data processing unit (DPU) 100 for receiving, processing and communicating site-specific data including spatially-variable data representing prescribed rates and types of seed throughout a field. DPU 100 communicates via bus 48 with variable rate/type controller (VRTC) 102 located in enclosure 66. DPU 100 further communicates with external systems such as an office computer 104 via a memory card 106. For example, memory card 106 is used to transfer geo-referenced seed type and rate maps between computer 104 and DPU 100 (both prescription and feedback maps), and can be a Type II PCMCIA card made by Centennial Technologies, Inc. However, DPU 100 could communicate with external systems using floppy or hard disks, RF, infrared or RS-232/485 bus or other mediums. DPU 100 receives the true ground speed signals from sensor 50.

DPU 100 includes a digital processor (e.g., 486DX or Pentium® microprocessor) and memory including nonvolatile memory (PROM, EEPROM or FLASH) to store programs executed by the processor and volatile (RAM) memory which may have a battery back-up circuit. However, dedicated, specific purpose equipment or hard-wired logic circuitry could be used. DPU 100 communicates with an operator through a user interface 108 via bus 110 (e.g., RS-232/485 or keyboard interface). Interface 108 can include, for example, a graphical user interface 112 providing cursor control (e.g., mouse, joystick or four-way switch with up, down, right and left positions), assignable switches 114 (e.g., push buttons) configurable by the processor, a keyboard 116 and a voice communication interface 118.

DPU 100 generates display signals applied to a reconfigurable display 120 (e.g., CRT or flat screen) via bus 122. Display 120 may include an active-matrix LCD display capable of displaying alpha-numeric characters, graphics, and full-motion video in a number of colors under varying ambient light conditions. Display 120 is used, inter alia, to display the current configuration of assignable switches 114 and planting data (e.g., status, control and configuration data). DPU 100, interface 108 and display 120 are located in the cab for easy access to user interface 108 and a substantially unobstructed view of display 120. DPU 100 may communicate with a printer 124 via an interface 126 (e.g., an RS-232 link).

DPU 100 also communicates with a location signal generation circuit 128 which generates location signals representing the position of tractor 10. Circuit 128 includes a global positioning system (GPS) receiver 130 with an associated antenna 132, and a differential GPS (DGPS) receiver 134 with an associated antenna 136. A single antenna may be used in place of antennas 132 and 136. GPS receiver 130 may be made by Trimble Navigation Ltd. of California, and DGPS receiver 134 may be made by Satloc, Inc. of Arizona. GPS receiver 130 determines longitude and latitude coordinates (and altitude) of the vehicle from signals transmitted by the GPS satellite network. The accuracy of the position data is improved by applying correction signals received by DGPS receiver 134. The differential correction signals are used to correct errors on GPS signals including the selective availability error signal added to GPS signals by the U.S. government. DGPS correction signals are transmitted by the U.S. Coast Guard and/or commercial services. For example, the Omnistar DGPS system from John E. Chance & Assoc. of Texas includes a network of land-based differential reference stations which send correction signals to a master station which uploads signals to a satellite for broadcast throughout North America. DGPS signals may also be transmitted from a local base station such as the top of a building. In one embodiment, DPU 100 interfaces with the SATLOC L-Band Integrated TerraStar DGPS System via an RS-485 communication link.

Figure 3:
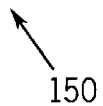
FIG. 3 is a table representing a predetermined geo-referenced map including spatially-variable map data indicative of prescribed types and rates of seed.

Referring to FIG. 3, DPU 100 is provided with predetermined geo-referenced maps or data layers 150 via memory card 106. Map 150 is generated by office computer 104 based upon field parameters which affect the desired types and rates of seed which will be applied. Map 150 is preferably implemented by a geographical information system (GIS) database stored as a DOS file in card 106, and can be represented by a table wherein rows represent field positions, and columns represent longitude/latitude coordinates, application rate (seeds/acre) and seed type (bin number) for each field position. For example, data point 3 indicates that the type of seed in bin 2 will be applied at a rate of 24,200 seeds/acre at the position at longitude -88.7290720 and latitude 39.0710740.

The map format shown in FIG. 3 is also used when DPU generates maps indicating the actual types and rates of seed application. The actual rates depend on rate feedback data transmitted from VRTC 102 to DPU 100, and the actual types depend on feedback data from VRTC 102 or on the commanded type. The actual rates and types are correlated with location signals received from location signal generation circuit 128 representing positions in the field at which seed was applied, and the correlated data is stored as layers in memory circuit 106.

Figure 4:
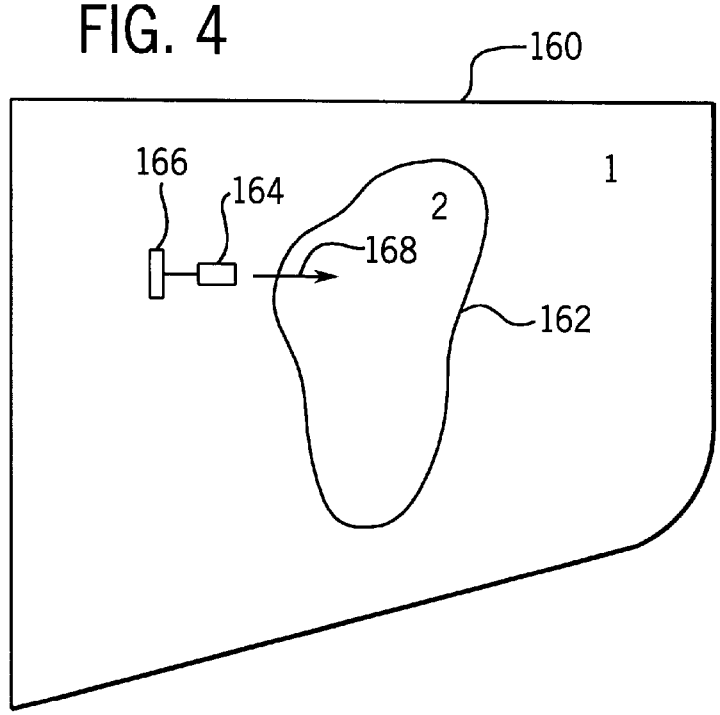
FIG. 4 is a graphical representation of a seed type prescription map stored using polygons, markers representing the position of the planting apparatus, and an arrow representing an expected course of travel.

FIG. 4 represents a predetermined geo-referenced map of a field 160 which includes spatially-variable data indicative of prescribed types of seed. The seed type in bin 1 is prescribed around the perimeter of field 160 and the seed type in bin 2 is prescribed for an interior area delineated by a polygon 162. For example, the map could have been generated using data indicating that the area within polygon 162 is receiving heavy insect pressure, with the seed type in bin 1 being conventional seed and the seed type in bin 2 being insect resistant seed. The prescription rate can be represented in a similar manner.

The current positions of tractor 10 and implement 16 are shown by markers 164 and 166, respectively, and the expected course of travel is shown by an arrow 168. The currently prescribed seed type is the seed in bin 1, and tractor 10 is about to enter the area bounded by polygon 162 wherein the seed type in bin 2 is prescribed.

Figure 5:
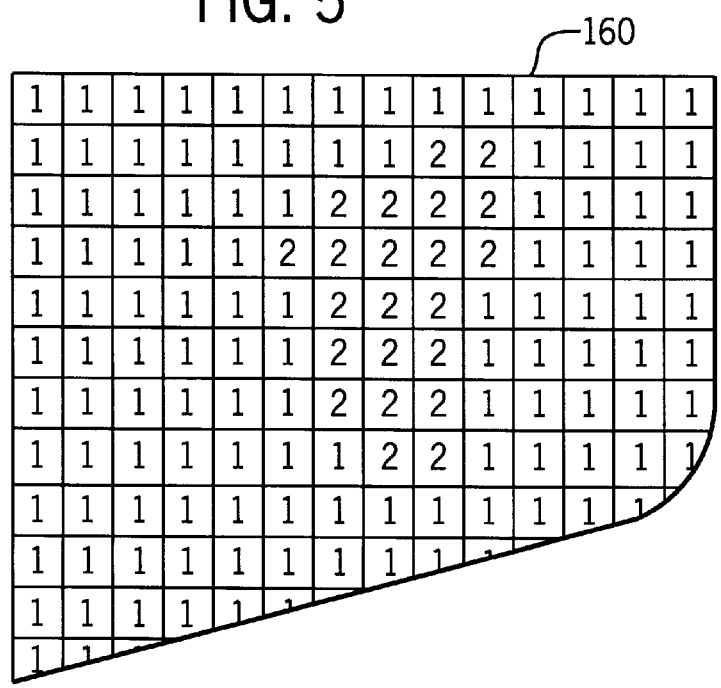
FIG. 5 is a graphical representation of the seed type prescription map shown in FIG. 4 except that the map is stored using rasters instead of polygons.

As shown in FIGS. 4 and 5, prescription type and rate maps for seed may be stored using polygon or raster representations. In FIG. 4, each polygon surrounds an area of field 160 having the same prescription type or rate, and only the vertexes of the polygons are stored. In FIG. 5, each raster (e.g., square block with sides equal to or an even multiple of the length of implement 16) includes an area having the same prescription type or rate. The numeral in each polygon or block represents the type or rate of seed prescribed. A comparison of FIGS. 4 and 5 reveals that both representations can store the same prescription map. Polygons generally use less memory and are more accurate. However, the accuracy of raster representations can be made equal to the polygon representation by decreasing the block size.

In operation, DPU 100 transmits signals to VRTC 102 for controlling the seeding process. For example, DPU 100 receives the location signals generated by location signal generation circuit 128 and determines the current positions of the planting apparatus therefrom, uses the current positions as indices to the seed type and rate prescription maps stored in card 106, and then transmits prescribed rate and type signals to VRTC 102 via bus 48. In response, VRTC 102 controls the rate and type of seed planted and sends feedback signals back to DPU 100 which represent the actual rate and type of seed planted. DPU 100 correlates the actual rate and type of seed planted with the positions of the planting implement and creates actual rate and type feedback maps therefrom.

Switches 114 can be assigned by DPU 100 to provide the operator with control over the seeding process. In one embodiment, a switch 114 is assigned to be a type switch for generating signals to select a desired type of seed as the switch is manually moved between positions representing the multiple seed types. DPU 100 reads the type signals and transmits the desired type to VRTC 102, which dispenses the desired type. In another embodiment, one switch 114 is similarly assigned to be a type switch and another switch 114 is assigned to be a mode switch having manual and automatic positions. DPU 100 reads the type and mode signals and transmits the desired type of seed if manual mode is selected, and the prescribed type of seed based upon the prescription map if automatic mode is selected. Similarly, an input device (e.g., switches 114 or another input device such as a potentiometer) can be provided to allow manual selection of a desired rate, and a switch 114 can be assigned to be a rate mode switch to select between manual and automatic rate modes wherein DPU 100 transmits the desired seed rate in manual mode and the prescribed seed rate in automatic mode.

User interface 108 can also be configured to allow an operator to enter configuration signals for variable rate and type application which are transmitted to VRTC 102. Configuration data can include constants required by VRTC 102 such as row width and the parameters of drum 76 (e.g., seed constant). Changes in configuration data allow an operator to easily change drums 76 for different types of seed, or to reconfigure the system for different planters and drills.

Referring to FIG. 6, components of variable rate and type control system 200 including VRTC 102 are shown. As described above, VRTC 102 receives true ground speed signals from sensor 50 and communicates with DPU 100. VRTC 102 also receives signals from a redundant ground speed sensor 202, an implement status switch 204, a calibration enable switch 206, a motor shaft speed sensor 208, and optional seed bin status sensors 210 and 212. VRTC 102 is preferably located within enclosure 66, but may also be supported by tractor 10. VRTC 102 includes a microprocessor, memory and input and output circuits.

Redundant ground speed sensor 202 is coupled to carrying wheels 56 and provides a redundant ground speed signal. VRTC 102 compares the redundant ground speed signal to the true ground speed signal to determine if the true ground speed signal is erroneous. Erroneous signals may occur since the radar used for sensor 50 generates false speed signals under certain conditions (e.g., waving grass may cause true ground speed signals to indicate speeds even if tractor 10 is standing still). VRTC 102 keeps variable rate and type outputs turned off unless both speed signals are received without errors. Sensor 202 can include an encoder-type sensor generating 360 pulses/rev (e.g., Dickey-John P/N 46436-0170).

Implement status switch 204 provides status signals indicating whether implement 16 is raised or lowered. If mounted, implement 16 is raised and lowered by hitch 12 in response to actuations of a hitch raise/lower switch (not shown), and switch 204 is located on the hitch. If trailed, implement 16 is moved by a hydraulic actuator which receives oil from another AUX valve under operator control, and switch 204 is coupled to carrying wheels 56. VRTC 102 enables and disables variable rate and type control when the status signals indicate that implement 16 is lowered and raised, respectively. For example, if implement 16 is raised on a headland, seed application is stopped by setting PWM rate control signals 218 to 0.

Calibration enable switch 206 is on implement 16 at a location accessible to an operator standing beside the implement. In response to actuation of switch 206, VRTC 102 allows the variable rate and type components to move even if no ground speed signal is present. Switch 206 can be used for static calibration wherein drum 76 is allowed to rotate even when implement 16 is stationary.

Hydraulic motor shaft speed sensor 208 is coupled to metering shaft 30 and generates signals representing the rotation rate of hydraulic motor 28. Since the rate of application depends on the rotation rate of drum 76, the shaft speed signals in combination with the ground speed provide seed rate feedback signals which are used for closed-loop control, and for mapping the actual rate of application. Sensors 202 and 208 are of the same type.

Seed bin sensors 210 and 212 are coupled to the seed bins and are configured to generate signals when the seed remaining in the respective bin falls below predetermined levels. The status signals can be transmitted to DPU 100 for display (to allow a manual override of the seed type or to refill the seed bins). Further, VRTC 102 could be programmed to automatically switch between bins when one bin becomes empty, with or without notifying the operator via DPU 100 and seeking permission via switch actuation. Sensors 210 and 212 are preferably optical. Signals from a seed counting sensor (not shown) read by VRTC 102 and transmitted to DPU 100 for display may also inform the operator that a type of seed has run out.

VRTC 102 provides type control signals 214 to a type switch 216, and rate control signals 218 to a pulse-width modulated (PWM) solenoid current amplifier circuit 220. Circuit 220 converts signals 218 from voltage to current and applies current signals 222 to a PWM solenoid 224 in an electromagnetic valve assembly 226. In response, a valve 228 regulates the supply of hydraulic fluid from function AUX valve 40 to hydraulic motor 28 via conduits 230, thus controlling the rotation rate of drum 76. VRTC 102 generates rate control signals 218 in a closed-loop using rate feedback signals from sensor 208. Preferably, assembly 226 includes a Vickers EPV 10 electrohydraulic valve (including PWM solenoid and valve), and hydraulic motor 28 includes a low-speed, high-torque, continuous-rotation motor (e.g., Georotor motor made by Danfoss). Valve assembly 226 includes a positive shut-off feature wherein flow is shut off when no power is applied.

By setting rate control signals 222 as a function of true ground speed and the commanded rate (prescription or desired) received from DPU 100, VRTC 102 controls the rotation rate of drum 76 and the seed application rate. VRTC 102 uses the following equation to determine the commanded shaft speed of the hydraulic motor (in rpm):

Shaft speed=(gear ratio*ground speed*rate*row width)/(seed constant*CONSTANT)

wherein gear ratio is a unitless measure of application rate sensor revolutions/drum revolutions, ground speed is in mph, rate is the commanded rate in seeds/acre, row width is the distance between planted rows in inches, seed constant is the number of seeds/drum revolution, and CONSTANT is a unitless quantity of 1/5940 for equalizing the different units used by the equation.

Referring to FIGS. 7–11, seed hopper 300 within enclosure 66 includes a front wall 302, a rear wall 304, side walls 306, and a floor 308 which slopes downwardly towards a seed discharge outlet 310 such that seed at the bottom of hopper 300 will slide down floor 308 towards the outlet. Hopper 300 includes a top assembly 312 which includes a lid (not shown) hinged onto top assembly 312 for loading seed into hopper 300. Hopper 300 can be made of fiberglass or other materials such as steel.

A dividing wall 314 within hopper 300 forms multiple seed bins 316 and 318. Preferably, wall 314 is removably mounted so that hopper 300 can be configured for applying either one or two types of seed. Wall 314 can be secured by sliding its ends 320 and 322 into channels (not shown) formed within front and rear walls 302 and 304, or can be secured by brackets. Wall 314 can be made of fiberglass or steel. Top assembly 312 is preferably fastened with removable fasteners (e.g., bolts or latches) to provide clearance for sliding wall 314 into and out of hopper 300 when top assembly 312 is removed.

A switch assembly 324 is provided within hopper 300 to select seed from bin 316 or bin 318. Switch assembly 324 includes an electric motor 326 secured to dividing wall 314 (e.g., with brackets 328), a shaft 330 driven by motor 326, a circular plate 332 mounted to shaft 330 above seed discharge outlet 310, and a square frame 334 secured to floor 308 between seed bins 316 and 318. Type switch 216 can include a driver circuit for motor 326, or VRTC 102 could drive motor 326 directly.

Motor 326 is preferably a servo motor including two built-in cams located on a final drive of a gear-head. The cams activate built-in microswitches for generating signals which stop shaft 330 at either of two angular positions spaced 180 degrees apart. The selected angular position depends upon type control signals 214 received by motor 326 from VRTC 102. Motor 326 is similar to the motors used in other agricultural applications, and is available from various motor suppliers. For example, agricultural sprayers use such a motor for turning a ball valve between two positions depending upon the state of a control signal. Alternatively, motor 224 can include other rotary actuators and limited angle torque motors.

Circular plate 332 has a shaft aperture 336 for receiving and securing shaft 330. Plate 332 includes a solid side 338 and a second side 340 with a semicircular (i.e., ½ revolution) aperture 342, although other aperture shapes can be used. Motor 326 and plate 332 are mounted such that first and second sides 338 and 340 are each completely within one of seed bins 316 and 318. When shaft 330 is stopped at the first angular position, first side 338 is located within seed bin 318 (i.e., bin 2) and second side 340 is located within seed bin 316 (i.e., bin 1). Thus, seed stored in bin 316 can be discharged through aperture 342 but seed stored in bin 318 is prevented from discharging by solid first side 338. Conversely, when shaft 330 is stopped at the second angular position, first side 338 is within seed bin 316 and second side 340 is within seed bin 318. Thus, seed in bin 318 can be discharged through aperture 342 but seed in bin 316 cannot be discharged. Therefore, plate 332 selectively allows discharge of seed from only one seed bin 316 and 318 based on the position of shaft 330, which in turn is controlled by type control signals 214. The outlets from seed bins 316 and 318 are referred to herein as the bin discharge outlets.

Square frame 334 includes an aperture 344 and may include struts 346 for holding a ring 348 within aperture 344 through which shaft 330 passes, thereby stabilizing the shaft. Frame aperture 344 aligns with plate aperture 342 regardless of the shaft position. Thus, frame 344 does not block the flow of seed under any condition. Frame 334 can have other shapes depending upon floor 308.

Referring to FIG. 12, another embodiment is shown wherein hopper 300 is divided into more than two bins. A second dividing wall 350 intersects first dividing wall 314 to divide hopper 300 into four seed bins 352–358. As shown, the bins have different capacities since bins 352, 354 are relatively large and bins 356, 358 are relatively small. Unequal capacities may be useful if only a small quantity of some seed types are needed. Alternatively, second wall 350 could be removably mounted at an angle with respect to front wall 302 such that the bins are of equal capacity. Switch assembly 324 has been modified by narrowing semicircular aperture 342 in circular plate 332 to ¼ revolution, and using a motor 326 moveable between four angular positions. Other bin configurations (e.g., 3 bins formed by extending wall 350 between a side wall 306 to first dividing wall 314) may also be provided.

Referring to FIG. 13, another embodiment is shown wherein the switch assembly includes an external valve 400 which receives grain from either of two seed bins 402 and 404. Input conduits 406 and 408 of valve 400 are coupled to seed bin discharge outlets 410 and 412. Valve 400 responds to type control signals 214 to allow only one type of grain to pass through to metering system 32.

Referring to FIG. 14, another embodiment is shown wherein the switch assembly includes two external valves 420 and 422 which receive grain from either of two seed bins 424 and 426. Valves 420 and 422 are coupled to seed bin discharge outlets 428 and 430, and response to type control signals 214 to allow only one type of grain to pass through to a seed supply tube 432. Air pressure from a fan 434 pushes the seed to metering system 32.

In operation, as described above, DPU 100 transmits the commanded rates and types of seed based upon signals generated by manual input devices or prescription maps. VRTC 102 receives the command signals and generates type and rate control signals 214 and 218 based upon the commanded types and rates. In response to type control signals 214, switch assembly 324 selectively discharges seed from the selected seed bin. In response to rate control signals 218, electrohydraulic valve 226 controls the fluid applied to drum 76 to apply the desired rate. Closed-loop feedback signals are provided by shaft speed sensor 208. VRTC 102 disables the variable rate and type actuators (i.e., rate control signals 218 set to 0 and no changes to type control signals 214) if the true ground speed signal is erroneous, or if implement 16 is raised.

The accuracy at which dispensing system 64 switches between seed types may be adversely affected by the delay required to switch between seed types when a type switch is commanded. The affects of the delay are described in relation to FIG. 4. Assuming, for example, a travel speed of 4 mph and a delay time of 13 seconds, implement 16 will travel 76 feet between the time a seed switch is commanded and the time the new seed type is planted. The 76 foot error will occur if DPU 100 generates the type command based upon the current position of the vehicle, even if an offset distance corresponding to the distance between the GPS receiver and implement 16 is applied. Thus, in FIG. 4, if DPU 100 waits until implement 16 reaches the border of polygon 162, the seed in bin 2 will not be applied to field 160 for the first 76 feet.

The delay occurs due to time required for seed in the seed pool to travel from the seed bins through the distribution assembly and to the row units. The "seed pool" is the seed of a first type which has been released from a first seed bin when a type switch is commanded but has not yet been processed and planted. The seed pool includes seed within seed discharge outlet 310, seed at the bottom of drum 76, and seed being delivered through delivery system 70. The delay due to seed in discharge outlet 310 is minimized by locating circular plate 332 and frame 334 as close as possible to the bottom of seed discharge outlet 310. However, there are limits as to how low switch assembly 324 can be mounted. The delay attributable to the seed in the discharge outlet can be further minimized by using external switch assemblies as in the systems of FIGS. 13 and 14.

Much delay, however, is due to the seed pool at the bottom of drum 76 when a switch occurs. To eliminate all or a substantial portion of the delay, DPU 100 can be programmed to anticipate seed type switches that will be commanded at expected positions forward of the current position of implement 16 along an expected course of travel. Seed type switches are then commanded before reaching those positions. In the above example, DPU 100 determines the expected position where implement 16 is expected to be in 13 seconds and uses the expected position as an index to the prescription type map to determine the anticipated seed type. Type control signals 214 are switched to select the seed in the second bin 13 seconds before implement 16 reaches the border of polygon 162. In manual mode, seed type switches can be manually anticipated and commanded by actuations of a type input device before the new seed type is desired.

The first step in determining the expected tractor position is to determine the expected course of travel forward of the current position. The expected course of travel can be determined from the current direction of travel and the assumption that tractor 10 will continue to travel in that direction. The current direction can be determined using signals from a compass or a vector from a prior to a current position of tractor 10. When tractor 10 is making repetitive passes through a field, the expected course can also be determined by assuming tractor 10 will travel parallel to the field borders or to the previous pass or row. The distance between the expected course and the borders or previous pass is the width of cut of implement 16. Borders may be stored in memory for use in determining the expected course.

Once the expected course is determined, an expected tractor position is estimated. The expected position is a distance forward of the current tractor position along the expected course. The distance can be predetermined, or can be an offset based upon the distance the tractor will travel during the delay time (i.e., ground speed multiplied by delay). For example, if the speed is 4 mph and the delay is 13 seconds, the offset is 76 feet. The expected position will be 76 feet forward of the current position of implement 16 in the direction of arrow 168. DPU 100 will then command VRTC 102 to switch types when implement 16 is 76 feet from the border of polygon 162.

Errors due to the delay can also be minimized using parallel distribution assemblies 68 to dispense multiple seed types as shown in FIGS. 15 and 16. Referring to FIG. 15, two distribution assemblies 68 are supported by frame 54, each receiving seed from its own bin. Each distribution assembly 68 applies seed when its function hydraulic motor 28 receives fluid from a diverter valve 500 controlled by type control signals 214. Valve 500 receives regulated fluid from electrohydraulic valve 226. Thus, rate control signals 218 control the application rate of the distribution assembly selected by valve 500. The parallel seed tubes 74 of each distribution assembly 68 are tied together at row units 58 by "Y"-shaped tubes 502 (shown only for the middle two row units). Delay is minimized since the seed type in each seed pool does not change. VRTC 102 selects the shaft speed feedback signal 504 to match the selected distribution assembly.

The system shown in FIG. 16 is similar to the system shown in FIG. 15 except that each distribution assembly 68 is driven independently by using parallel electrohydraulic valves 226. VRTC 102 generates parallel rate control signals 218 based upon the selected type of seed, and selects the shaft speed feedback signal 504 to match the distribution assembly selected.

In planting apparatus where a volume or mass of seed is applied (e.g., drills), the system shown in FIG. 16 can blend multiple seed types by simultaneously operating distribution assemblies 68. The blend ratio will depend upon the relative application rates. FIG. 16 is also advantageous in that each distribution assembly 68 can use a different drum 76 having holes sized for different sized seeds. Blending may also be provided by modifying the system of FIG. 7 to control the angular position of shaft 330 such that aperture 342 can be extended partly into each seed bin 316 and 318. For example, a stepper motor could be used for motor 326, and DPU 100 would select the shaft position to give the appropriate level of blending depending upon commanded type blend signals.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals; and a distribution assembly configured to receive the one type of seed selectively discharged through the first and the second discharge outlets depending upon the configuration of the switch assembly, and to distribute the received seed to the row units, wherein the distribution assembly includes a singulator for separating individual seeds for distribution to each row unit.

2. The system of claim 1 wherein the first and the second seed bins are formed within a single seed hopper by a dividing wall mounted within the hopper.

3. The system of claim 2 wherein the dividing wall is removably mounted using removable fasteners.

4. The system of claim 2 wherein the seed hopper includes a bottom portion having a seed discharge outlet, the first and second discharge outlets discharging to the distribution assembly through the seed discharge outlet.

5. The system of claim 1 further comprising at least a third seed bin configured to store at least a third type of seed, the third seed bin having a third discharge outlet to discharge the third type of seed, wherein the switch assembly is further configured to selectively discharge one of the first, the second and the third types of seed depending upon the control signals.

6. The system of claim 1 wherein the distribution assembly further includes a pressure air delivery system configured to deliver individual seeds to each row unit.

7. The system of claim 1 further comprising:

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field; and a control circuit coupled to the location signal generation circuit, the memory circuit and the switch assembly, the control circuit being configured to determine the prescribed type of seed based at least upon the location signals and the map data, to generate the control signals based upon the prescribed type of seed, and to apply the control signals to the switch assembly.

8. The system of claim 7 wherein the first and the second seed bins are formed within a single seed hopper by a dividing wall removably mounted within the seed hopper, and wherein the seed hopper includes a bottom portion having a seed discharge outlet, the first and the second discharge outlets discharging to the distribution assembly through the seed discharge outlet.

9. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals; and a distribution assembly configured to receive the one type of seed selectively discharged through the first and the second discharge outlets depending upon the configuration of the switch assembly, and to distribute the received seed to the row units, the first and the second seed bins being formed within a single seed hopper by a dividing wall mounted within the hopper, the seed hopper including a bottom portion having a seed discharge outlet, the first and second discharge outlets discharging to the distribution assembly through the seed discharge outlet;

wherein the switch assembly includes:

a motor secured to the dividing wall above the seed discharge outlet and including a shaft extending downwardly towards the seed discharge outlet, the shaft being rotatable between at least first and second angular positions in response to the control signals; and a circular plate mounted to the shaft above the seed discharge outlet and including a first side having a solid surface and a second side having an aperture;

wherein, with the shaft in the first angular position, the first and the second sides of the plate are aligned with the second and the first discharge outlets, respectively, to allow the discharge of only the first type of seed and, with the shaft in the second angular position, the first and the second sides are aligned with the first and the second discharge outlets, respectively, to allow the discharge of only the second type of seed.

10. The system of claim 9 wherein the switch assembly further includes a frame secured to the bottom portion of the hopper between the first and the second bins, the frame including at least one frame aperture aligned with the aperture of the circular plate when the shaft is in the first and the second angular positions.

11. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals; and a distribution assembly configured to receive the one type of seed selectively discharged through the first and the second discharge outlets depending upon the configuration of the switch assembly, and to distribute the received seed to the row units;

wherein the switch assembly includes a valve having first and second input conduits coupled to the first and the second discharge outlets and an output conduit coupled to the distribution assembly, the valve configured to couple one of the first and the second input conduits to the output conduit based upon the control signals.

12. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals; and a distribution assembly configured to receive the one type of seed selectively discharged through the first and the second discharge outlets depending upon the configuration of the switch assembly, and to distribute the received seed to the row units;

wherein the switch assembly includes first and second valves coupled between the first and the second discharge outlets, respectively, and the distribution assembly, the first and the second valves configured to selectively discharge one of the first and the second types of seed to the distribution assembly based upon the control signals.

13. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals;

a distribution assembly configured to receive the one type of seed selectively discharged through the first and the second discharge outlets depending upon the configuration of the switch assembly, and to distribute the received seed to the row units;

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field;

a control circuit coupled to the location signal generation circuit, the memory circuit and the switch assembly, the control circuit being configured to determine the prescribed type of seed based at least upon the location signals and the map data, to generate the control signals based upon the prescribed type of seed, and to apply the control signals to the switch assembly; and a first input device coupled to the control circuit and configured to generate signals indicative of a desired type of seed, the control circuit further configured to operate in a first mode wherein the control signals are based upon the prescribed type of seed and in a second mode wherein the control signals are based upon the desired type of seed.

14. The system of claim 13 further comprising a second input device coupled to the control circuit and configured to generate signals indicative of a desired mode, wherein the control circuit selectively operates in the first and the second modes in response to the desired mode signals.

15. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals;

a distribution assembly configured to receive the one type of seed selectively discharged through the first and the second discharge outlets depending upon the configuration of the switch assembly, and to distribute the received seed to the row units;

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field; and a control circuit coupled to the location signal generation circuit, the memory circuit and the switch assembly, the control circuit being configured to determine the prescribed type of seed based at least upon the location signals and the map data, to generate the control signals based upon the prescribed type of seed, and to apply the control signals to the switch assembly;

wherein the first and the second seed bins are formed within a single seed hopper by a dividing wall removably mounted within the hopper, and wherein the seed hopper includes a bottom portion having a seed discharge outlet, the first and the second discharge outlets discharging to the distribution assembly through the seed discharge outlet; and wherein the switch assembly includes:

a motor secured to the dividing wall above the seed discharge outlet and including a shaft extending downwardly towards the seed discharge outlet, the shaft being rotatable between at least first and second angular positions in response to the control signals; and a circular plate mounted to the shaft above the seed discharge outlet and including a first side having a solid surface and a second side having an aperture;

wherein, with the shaft in the first angular position, the first and the second sides of the plate are aligned with the second and the first discharge outlets, respectively, to allow the discharge of only the first type of seed and, with the shaft in the second angular position, the first and the second sides are aligned with the first and the second discharge outlets, respectively, to allow the discharge of only the second type of seed.

16. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the control signals;

a distribution assembly configured to receive the one type of seed selectively discharged through the first and the second discharge outlets depending upon the configuration of the switch assembly, and to distribute the received seed to the row units;

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field; and a control circuit coupled to the location signal generation circuit, the memory circuit and the switch assembly, the control circuit being configured to determine the prescribed type of seed based at least upon the location signals and the map data, to generate the control signals based upon the prescribed type of seed, and to apply the control signals to the switch assembly;

wherein the control circuit is further configured to determine an expected position of the vehicle forward of the current position along an expected course of travel of the planting apparatus, and the control signals depend upon the prescribed type of seed at the expected position, whereby switches between prescribed seed types are anticipated.

17. A system for dispensing multiple types of seed in response to first control signals generated as a planting apparatus travels throughout an agricultural field, the planting apparatus including a plurality of row units for applying seed to the field, the dispensed seed being applied at variable rates in response to second control signals, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, and into a seed discharge outlet depending upon the first control signals;

a seed meter configured to receive the one type of seed selectively discharged through the seed discharge outlet depending upon the configuration of the switch assembly, and to meter the received seed at a rate which depends upon the second control signals;

a delivery system configured to receive the metered seed from the seed meter and to distribute the metered seed to the row units;

a location signal generation circuit configured to receive positioning signals and to generate location signals therefrom which represent a current position of the planting apparatus;

a memory circuit configured to store a geo-referenced map including spatially-variable map data indicative of prescribed types of seed and rates of seed throughout the field; and a control circuit coupled to the location signal generation circuit, the memory circuit, the switch assembly and the seed meter, the control circuit being configured to determine the prescribed type of seed and rate of seed based at least upon the location signals and the map data, to generate the first and the second control signals based upon the prescribed type of seed and rate of seed, respectively, and to apply the first and the second control signals to the switch assembly and the seed meter, respectively.

18. The system of claim 17 wherein the seed meter includes a rotatable seed selector configured to separate individual seeds and the delivery system includes a pressurized air delivery system configured to deliver the individual seeds to the row units, the seed selector including a cylindrical drum driven for rotation by a motor having a variable rotation rate controlled by the second control signals, the seed dispensing rate depending upon the rotation rate of the drum, whereby the rate at which the seeds are dispensed depends upon the second control signals.

19. A system for dispensing multiple types of seed in response to first control signals generated as a planting apparatus travels throughout an agricultural field, the planting apparatus including a plurality of row units for applying seed to the field, the dispensed seed being applied at variable rates in response to second control signals, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a switch assembly coupled to the first and the second discharge outlets and configured to selectively discharge one of the first and the second types of seed through the first and the second discharge outlets, respectively, depending upon the first control signals;

a distribution assembly configured to receive the one type of seed selectively discharged through the first and the second discharge outlets depending upon the configuration of the switch assembly, and to distribute the received seed to the row units at a rate which depends upon the second control signals;

a location signal generation circuit configured to receive positioning signals and to generate location signals therefrom which represent a current position of the planting apparatus;

a memory circuit configured to store a geo-referenced map including spatially-variable map data indicative of prescribed types of seed and rates of seed throughout the field; and a control circuit coupled to the location signal generation circuit, the memory circuit, the switch assembly and the distribution assembly, the control circuit being configured to determine the prescribed type of seed and rate of seed based at least upon the location signals and the map data, to generate the first and the second control signals based upon the prescribed type of seed and rate of seed, respectively, and to apply the first and the second control signals to the switch assembly and the distribution assembly, respectively;

wherein the control circuit is further configured to determine an expected position of the planting apparatus forward of the current position along an expected course of travel of the planting apparatus, and the first control signals depend upon a prescribed type of seed at the expected position, whereby switches between the prescribed seed types are anticipated.

20. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a first distribution assembly configured to receive the first type of seed discharged through the first discharge outlet and to distribute the first type of seed to the row units based upon the control signals, the first distribution assembly including a first singulator for separating individual seeds for distribution to each row unit and a plurality of first seed tubes for delivery of the individual seeds to the respective plurality of row units;

a second distribution assembly configured to receive the second type of seed discharged through the second discharge outlet and to distribute the second type of seed to the row units based upon the control signals, the second distribution assembly including a second singulator for separating individual seeds for distribution to each row unit and a plurality of second seed tubes for delivery of the individual seeds to the respective plurality of row units; and a plurality of seed tube connectors, each seed tube connector configured to receive the individual seeds from one of the first seed tubes and one of the second seed tubes for delivery to one of the plurality of row units.

21. The system of claim 20 further comprising:

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field; and a control circuit coupled to the location signal generation circuit, the memory circuit, and the first and the second distribution assemblies, the control circuit being configured to determine the prescribed type of seed based at least upon the location signals and the map data, to generate the control signals based upon the prescribed type of seed, and to apply the control signals to the first and the second distribution assemblies.

22. The system of claim 21 wherein the first and the second distribution assemblies distribute the first and the second types of seed to the row units at rates which depend upon the control signals, the map data is further indicative of prescribed rates of seed throughout the field, and the control circuit is further configured to determine the prescribed rate of seed based at least upon the location signals and the map data, to generate the control signals based upon the prescribed rate of seed, and to apply the control signals to the first and the second distribution assemblies.

23. A system for dispensing multiple types of seed in response to control signals generated as a planting apparatus travels throughout an agricultural field, the planting apparatus including a plurality of row units for applying seed to the field, the system comprising:

a first seed bin configured to store a first type of seed, the first seed bin having a first discharge outlet to discharge the first type of seed;

a second seed bin configured to store a second type of seed, the second seed bin having a second discharge outlet to discharge the second type of seed;

a first distribution assembly configured to receive the first type of seed discharged through the first discharge outlet and to distribute the first type of seed to the row units based upon the control signals;

a second distribution assembly configured to receive the second type of seed discharged through the second discharge outlet and to distribute the second type of seed to the row units based upon the control signals;

a location signal generation circuit configured to receive positioning signals and to generate location signals therefrom which represent a current position of the planting apparatus;

a memory circuit configured to store a geo-referenced map including spatially-variable map data indicative of prescribed types of seed throughout the field;

a control circuit coupled to the location signal generation circuit, the memory circuit, and the first and the second distribution assemblies, the control circuit being configured to determine the prescribed type of seed based at least upon the location signals and the map data, to generate the control signals based upon the prescribed type of seed, and to apply the control signals to the first and the second distribution assemblies; and an operator input device coupled to the control circuit and configured to generate signals indicative of a desired type of seed, the control circuit further configured to operate in a first mode wherein the control signals are based upon the prescribed type of seed and in a second mode wherein the control signals are based upon the desired type of seed.

24. A system for dispensing multiple types of seed in response to control signals generated as a planting apparatus travels throughout an agricultural field, the planting apparatus including a plurality of row units for applying seed to the field, the system comprising:

means for storing a first type of seed and for discharging the first type of seed through a first discharge outlet;

means for storing a second type of seed and for discharging the second type of seed through a second discharge outlet;

means for selectively discharging one of the first and the second types of seed through the first and the second discharge outlets, respectively, and into a seed discharge outlet depending upon the control signals;

means for receiving the one type of seed selectively discharged through the seed discharge outlet;

means for separating the one type of received seed into individual seeds; and means for distributing the individual seeds to each row unit.

25. The system of claim 24 further comprising:

means for generating location signals representing a current position of the planting apparatus;

means for storing a geo-referenced map including spatially-variable map data indicative of prescribed types of seed throughout the field; and means for determining the prescribed type of seed based at least upon the location signals and the map data, for generating the control signals based upon the prescribed type of seed, and for applying the control signals to the selective discharge means.

26. The system of claim 25 wherein the spatially-variable map data is further indicative of prescribed rates of seed throughout the field, further comprising:

means for distributing the received seed to the row units at a rate which depends upon second control signals; and means for determining the prescribed rate of seed based at least upon the location signals and the map data, for generating the second control signals based upon the prescribed rate of seed, and for applying the second control signals to the distributing means.

* * * * *